United States Patent [19]
Lemkin

[11] Patent Number: 6,145,474
[45] Date of Patent: Nov. 14, 2000

[54] ADJUSTABLE ANIMAL FEEDER ASSEMBLY WITH STORAGE CAPABILITY

[76] Inventor: Jack Lemkin, 579 Glenmont Ave., Columbus, Ohio 43214

[21] Appl. No.: 09/576,966

[22] Filed: May 24, 2000

[51] Int. Cl.[7] .................................................. A01K 5/01
[52] U.S. Cl. ................................ 119/61; 220/8; 220/529
[58] Field of Search .................................. 119/61, 51.01, 119/51.5, 72, 74; 220/8, 528, 529; 47/39; D30/121, 130

[56] References Cited

U.S. PATENT DOCUMENTS

| | | |
|---|---|---|
| D. 335,007 | 4/1993 | McPhee . |
| D. 393,107 | 3/1998 | Tsengas . |
| 3,105,592 | 10/1963 | Cohen ........................................ 206/8 |
| 3,651,787 | 3/1972 | Cooper . |
| 3,901,406 | 8/1975 | Kivett ......................................... 220/8 |
| 4,044,723 | 8/1977 | Fitzpatrick . |
| 4,065,195 | 12/1977 | Fahmie . |
| 4,624,382 | 11/1986 | Tontarelli .................................... 220/8 |
| 4,699,089 | 10/1987 | Teschke . |
| 4,976,223 | 12/1990 | Pierce . |
| 5,000,124 | 3/1991 | Bergen . |
| 5,054,431 | 10/1991 | Coviello . |
| 5,222,990 | 6/1993 | Elliott . |
| 5,392,941 | 2/1995 | Robbins ..................................... 220/8 |
| 5,501,176 | 3/1996 | Tully . |
| 5,509,376 | 4/1996 | Tsengas . |
| 5,562,212 | 10/1996 | Rosler ..................................... 206/443 |
| 5,730,081 | 3/1998 | Tsengas . |
| 5,904,117 | 5/1999 | Castro . |

*Primary Examiner*—Michael J. Carone
*Assistant Examiner*—James S. Bergin
*Attorney, Agent, or Firm*—Hoffman, Wasson & Gitler, PC

[57] ABSTRACT

An animal feeder assembly including a top and a base. The top comprising an upper surface with a depending sidewall, while the base comprises a bottom wall with an upstanding sidewall. Ribs are spaced about the interior surface of the depending sidewall of the top, and depressions are formed in the outer surface of the sidewall of the base. The top is slightly larger than the base, and fits thereover. The top can be rotated 180° relative to the base, between two operative positions. In one operative position, the ribs pass through the grooves so that the top telescopes over the base to provide a Lowered feed assembly; in the other operative position, the top is extended, relative to the base, to form an elevated feed assembly. A large storage area is formed in the interior of the feeder assembly.

6 Claims, 6 Drawing Sheets

ADJUSTABLE ANIMAL FEEDER ASSEMBLY WITH STORAGE CAPABILITY

BACKGROUND OF THE INVENTION

1. Field of the Invention

The instant invention relates generally to animal feeder assemblies, and more particularly to an adjustable feeder assembly for feeding small and large dogs.

2. Description of the Related Art

Feeder assemblies for dogs have usually been configured for small dogs, or large dogs. Feeder assemblies for small dogs were usually situated at floor level. However, veterinarians and pet owners recognize that the health of large dogs, such as Mastiffs, Great Danes, St. Bernards, etc. and like, would be adversely affected if such dogs were fed from feeders situated at floor level. The larger dogs encountered digestive problems and back misalignment problems, from eating in such an uncomfortable position.

Several elevated animal feeding device for improving the posture and digestion of large dogs have been developed. To illustrate, U.S. Pat. No. 5,509,376, granted Apr. 23, 1996, to Steven Tsenaas, discloses an animal feeder assembly (10) that provides food and water, at an elevated position from a support surface (18), and is therefore well suited for feeding large dogs in a manner which avoids digestive and posture problems. The feeder assembly comprises a feeder tray (12) and a plurality of hollow legs (14) releasably attached to the feeder tray. Each hollow leg is capable of holding ballast material (16, 16') for lowering the center of gravity of the assembly relative to the support surface. The tray and legs are preferably made of blow molded plastic, and the tray is formed to include a closed interior cavity (62, as shown in FIG. 3) which facilitates cleaning the assembly. Each leg is releasably attached to the tray, and may be releasably locked to a receptacle (46) formed in a bottom surface of the tray. Protuberances (50) on each leg cooperate with recesses (48) in each receptable to accomplish the releasable locking action.

U.S. Pat. No. 5,501,176, granted Mar. 26, 1996, to Tara S. Tully discloses an animal feeder assembly (11) that may be adjusted for height, so that larger dogs may be fed in a convenient manner. The assembly includes a bracket (15) that stands upright on a base (17) attached to the bracket with a hinge (47). The hinge is biased by a spring (49) to hold the bracket upright and at right angles to the base. The bracket has horizontal slots (31) located at intervals along its vertical length. A tray (19), with spaced apertures (39) to receive feeding bowls, is attached to the bracket by a hinge (21) having two leaves (23, 25). The height of the tray, relative to the support surface, is adjustable by placing the free end of one of the leaves into different slots.

Tescke discloses a pet feeder, particularly for dogs, including a storage container (20) for storage of food and accessories, and a removable feeding table (30) which prevents access, by the pet, to storage area. The feeding table is removable by a vertically upward movement. Removable food and water bowls (40) fit into apertures (33) in the feeding table, and a splashboard (32, 35, 39) is formed along the sides and rear surface of the feeding table.

U.S. Pat. No. 3,651,797, granted Mar. 28, 1972, to Pauline E. Cooper, discloses a feeding stand for household pets including adjustable supporting members (15) which, when extended downwardly, raise the food supporting surface.

However, the known feeder assemblies discussed above, have suffered from one, or more, of the following shortcomings. In some instances, the animal feeder assembly has required several components that are difficult to manufacture and assemble. In other instances, the animal feeders have proven to be cumbersome and difficult to transport, and have required considerable shelf space. Also, some of the animal feeders have proven to be difficult to clean, and few of the animal feeders have provided for the storage of pet food.

SUMMARY OF THE INVENTION

In view of the shortcomings associated with known animal feeders, the present invention is directed to a versatile, animal feeder suitable for use with small dogs, as well as larger dogs. The animal feeder is formed of two molded plastic components, an upwardly opening hollow base and a downwardly opening hollow cover. A series of ribs spaced about the interior of the cover cooperates with a series of grooves spaced about the perimeter of the base.

In one position, the ribs slide down the grooves, so that the cover telescopes over the base, thereby positioning the food and water bowls in a lowered position, suited for feeding small dogs. In a second position, the ribs rest upon the upper ends of the walls of the base, thereby positioning the food and water bowls in an elevated position, suited for feeding large dogs. The first and second positions are attained by the simple expedient of rotating the cover by 180°.

A notch may be formed in the lower end of each rib to increase the stability of the feeder assembly. The feeder assembly is easily cleaned, and grips are formed at opposite sides of the top to facilitate the rotational movement.

The molded tops and bases are nestable and stackable, thus conserving storage and shelf space in warehouses, stores, and retail facilities.

Furthermore, the hollow interior of the base is available as storage space for dog food, canine treats, and the like. The storage area, when filled, serves as ballast to keep the feeder assembly stable and relatively immobile.

Other objects and advantages realized by the instant invention will become readily apparent to the skilled artisan when the specification and the appended drawings are construed in harmony.

DETAILED DESCRIPTION OF THE PREFERRED EMBODIMENT

Figure 1:
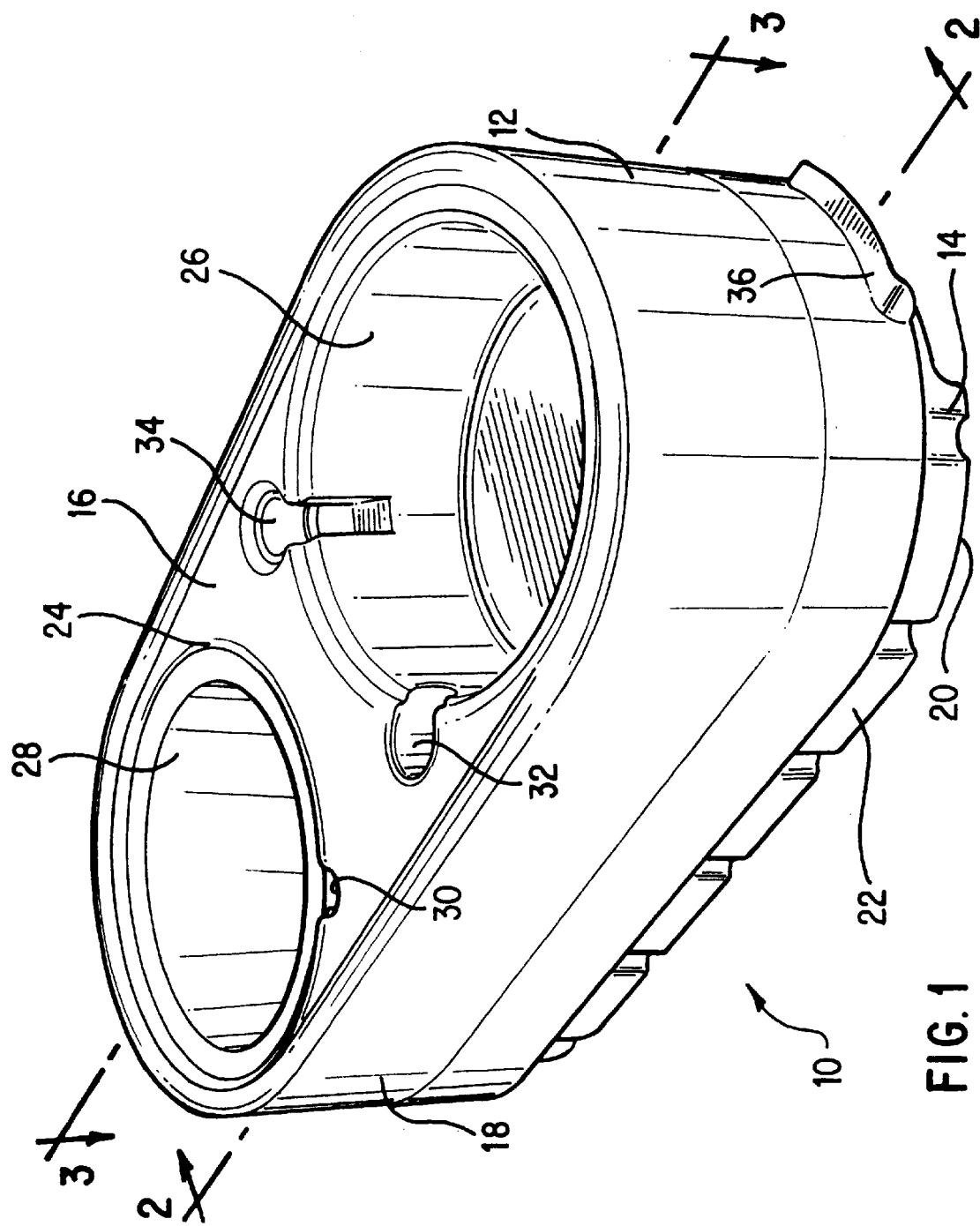
FIG. 1 is a perspective view of an animal feeder assembly constructed in accordance with the principles of the instant invention, the feeder assembly shown in its lowered position.

Referring now to the drawings, FIG. 1 depicts a unique animal feeder assembly, indicated generally by reference numeral 10. Assembly 10 comprises two cooperating, injection molded plastic components, namely top 12 and base 14. Top 12 comprise an upper surface 16 and a depending sidewall 18; the top opens downwardly. The top is slightly larger than the base, and is shaped to fit thereover.

Base 14 comprises a bottom wall 20 and an upstanding sidewall 22; the base opens upwardly. Recess 24, 26 are formed in the upper surface of top 12; and a removeable metal bowl 28 is placed in recess 24. Depressions 30 and 32 allow the person feeding the animal to readily remove the bowl 28 for cleaning, and threaded depression 34 is provided adjacent to recess 26 for attaching a bottle (not shown). A bowl, for water, would usually occupy recess 18. Hand grips 36, 38 are located at opposite ends of top 12.

Figure 2:
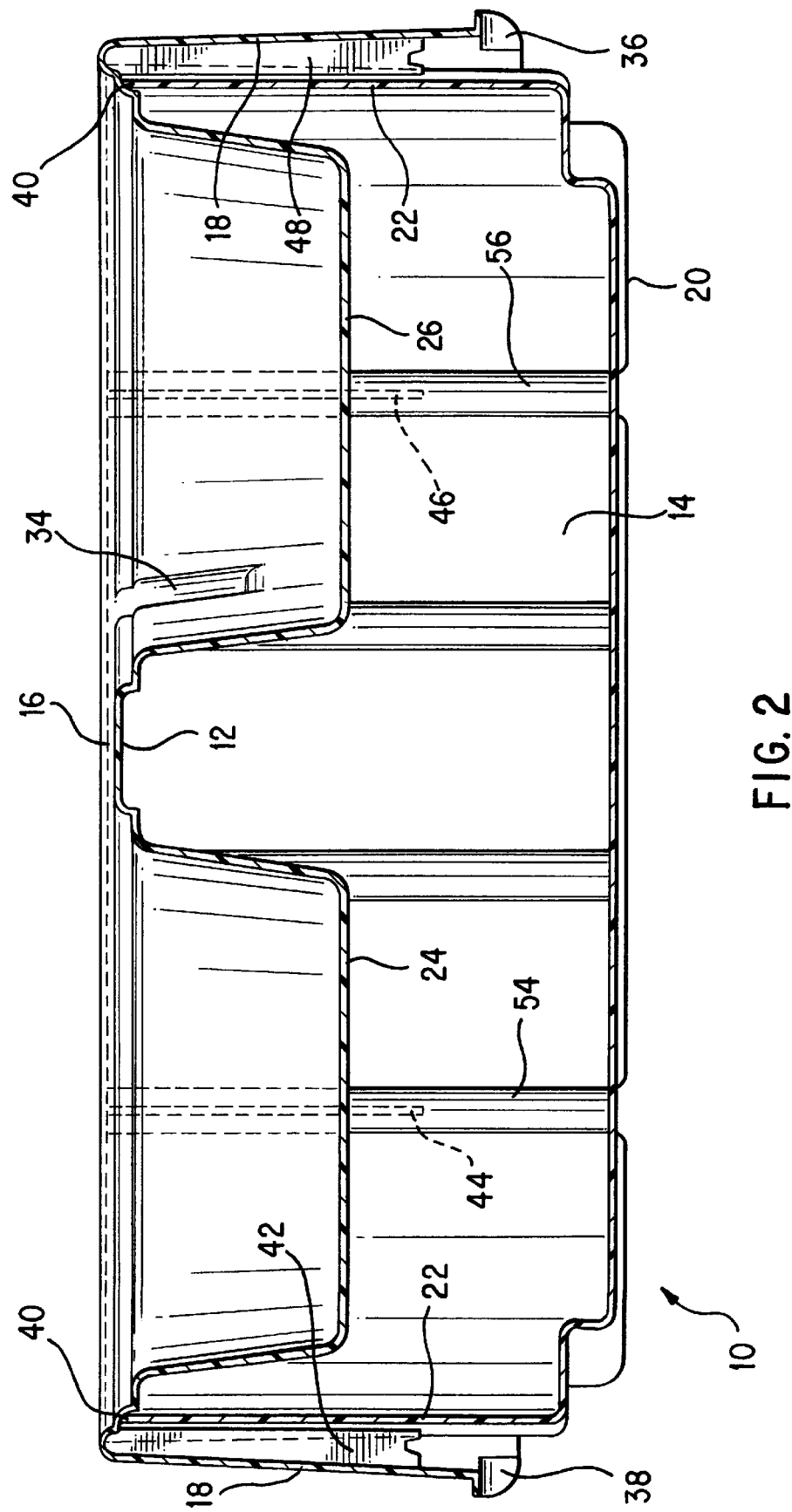
FIG. 2 is a vertical, cross-sectional view of the feeder assembly of FIG. 1, such view being taken along line 2—2 in FIG. 1 and in the direction indicated.

FIGS. 1 and 2 show the manner in which top 12 fits over base 14, in a telescoping fashion, so that the underside of top 12 rests on the upper edge 40 of side wall 22 of base 14. The feeder assembly is thereby reduced in height and is suitable for use by small to medium sized dogs.

Figure 3:
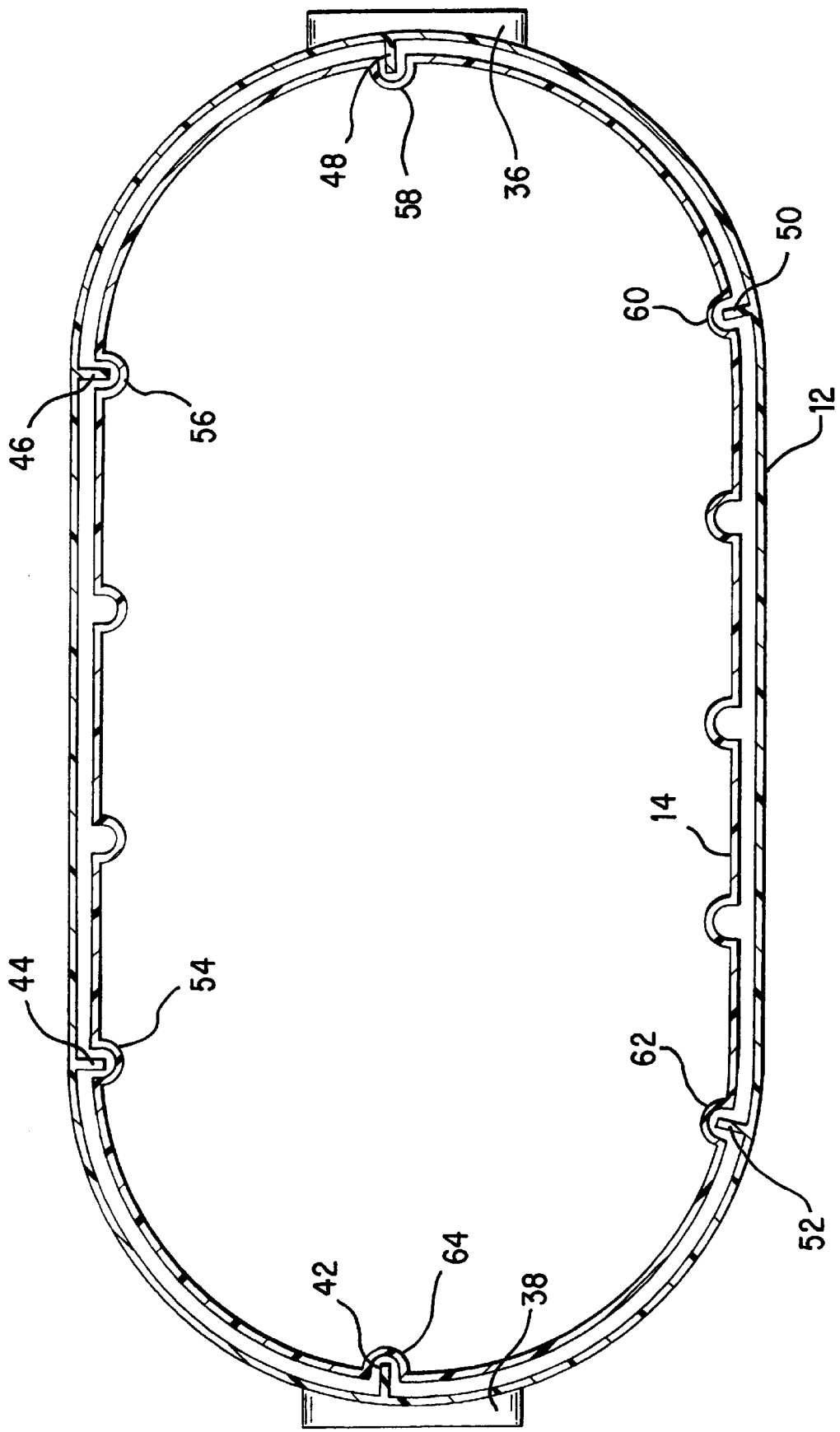
FIG. 3 is a horizontal, cross-sectional view of the feeder assembly of FIG. 1, such view being taken aLong line 3—3 in FIG. 1 and in the direction indicated.

A set of ribs 42, 44, 46, 48, 50, 52 is formed at regular intervals, about the interior surfaces of top 12, as shown in FIGS. 2 and 3. The ribs strengthen top 14. Inwardly extending grooves 54, 56, 58, 60, 62 and 64, defined in the wall of base 14 cooperate with the inwardly extending ribs in top 12. The ribs may be tapered slightly, so that the lower edge of the rib is greater in size than the upper end of the rib, as shown in FIG. 2.

The interior of base 14 is hollow, and may retain a large quantity of dog food. The dog food (not shown) weighs down feeder assembly 10, and prevents the feed assembly from sliding along a support surface.

Figure 4:
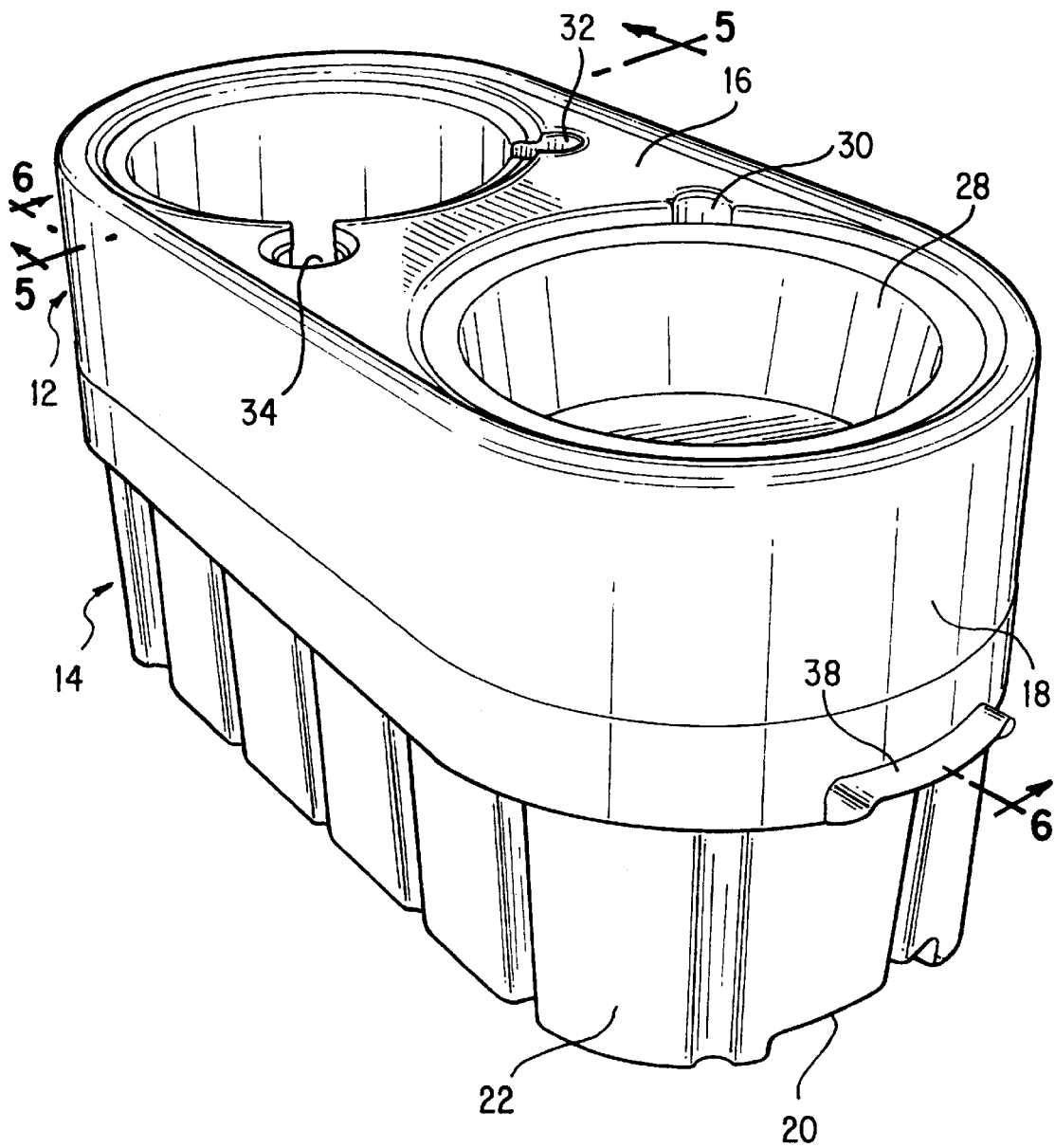
FIG. 4 is the perspective view of FIG. 1, but showing the feeder assembly in its elevated position.

FIG. 4 depicts animal feeding assembly 10 in its elevated position. To attain such position, the pet owner grasps hand grips 36 and 38, removes top 12 from the base 14, and then rotates top 12 180°. The top, after being rotated, is placed on top of base 14. Ribs 42, 44, 46, 48, 50 and 52, which are slightly tapered and are identical in shape, engage upper edge 40 of upstanding sidewall 22 of base 14. The elevated, or extended, position of feeder assembly is thereby defined. In such position, feeder assembly 10 efficiently services large dogs.

Figure 5:
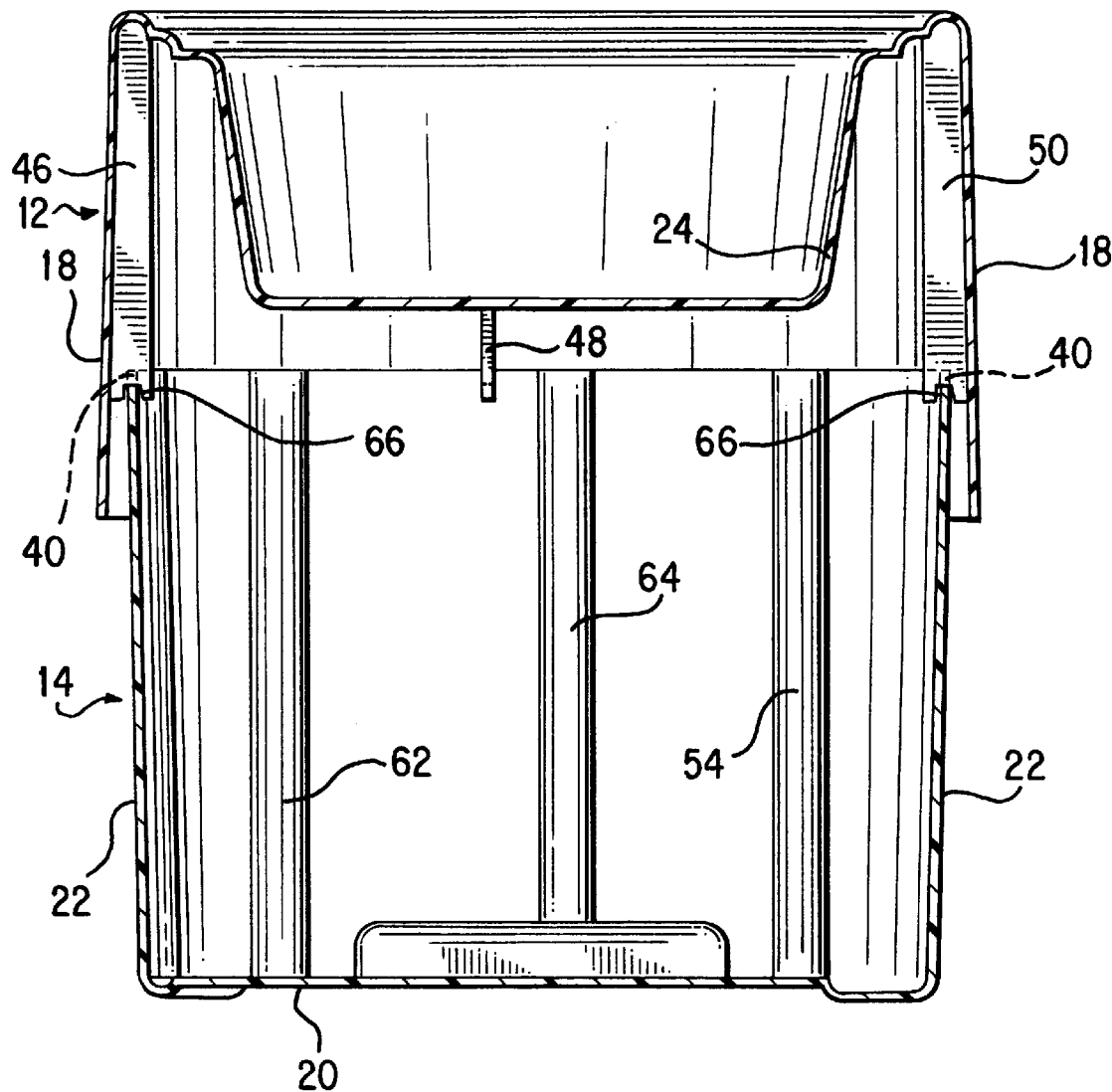
FIG. 5 is a horizontal, cross-sectional view of the feeder assembly of FIG. 4, such view being taken along line 5—5 in FIG. 4 and in the direction indicated.
Figure 6:
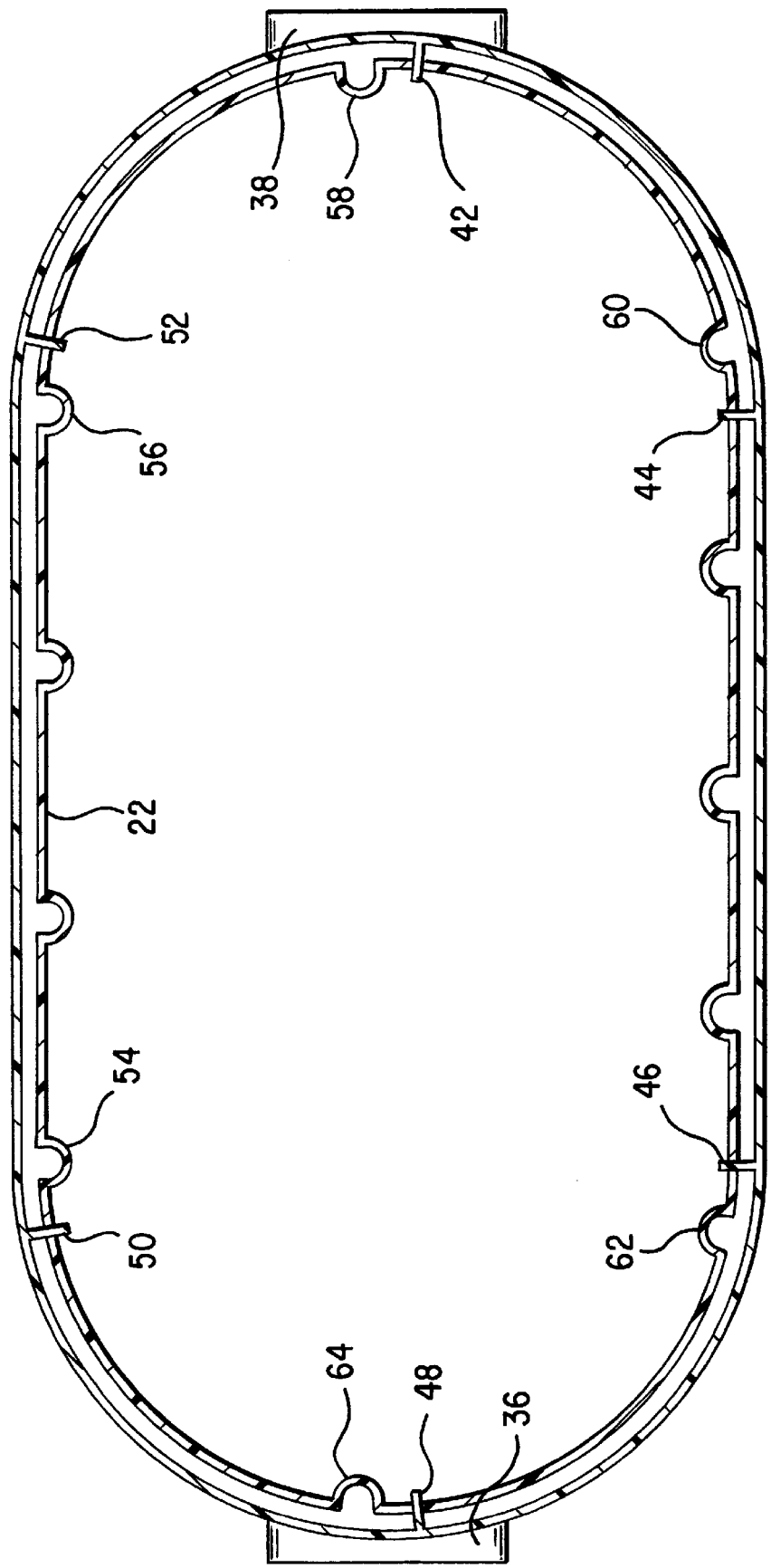
FIG. 6 is a fragmentary view, of a rib on the cover engaging the lip of the base of the feeder assembly, such view being taken along line 6—6 in FIG. 5 and in the direction indicated.

FIG. 5 shows the manner in which ribs 42, 44, 46, 48, 50 and 52 engage upper edge 40 of upstanding sidewall 22 of base 14. A notch 66 formed in the lower edge of rib 42 for engagement with upper edge 40 of sidewall 22 of base 14. Similar notches 66 are formed in each of the several ribs. The notches provide a large contact area, and compensate for molding tolerances, minor misalignments, etc. The relationship of the several ribs to grooves 54, 56, 58, 60, 62 and 64, is shown in FIG. 6.

When the pet owner wishes to convert animal feeder assembly into a small animal feeder, top 12 is rotated 180° to allow top 12 to fit over base 14, in a telescoping fashion, once again. Top 12 may be lifted upwardly from base 14 to gain access to the dog food, or dog treats, stored within the interior of base 14.

The foregoing description of the preferred embodiment of the animal feeder assembly should be construed in an illustrated manner, for other modifications will occur to the skilled artisan. For example, while six ribs are employed, more or fewer ribs could be employed. The same holds true for the number of grooves in the outer surface of the base. Also, while notches are formed in the ribs for increased stability, the ribs could have unbroken lower edges and notches could be formed in the upper edge 40 of the base 14. While intended primarily for dogs, the feeder assembly may find application with other animals. Consequently, the appended claims should be liberally construed in a manner consistent with the spirit and scope of the invention, and should not be limited to their literal terms.

I claim:

1. An animal feeder assembly comprising:
   a) a base comprising a bottom wall with an upstanding sidewall extending about said bottom wall,
   b) vertically extending grooves defined at spaced intervals about the exterior surface of said upstanding sidewall,
   c) a top comprising an upper surface with a depending sidewall extending about said upper surface;
   d) depressions formed in said upper surface to receive feeding bowls,
   e) ribs spaced about the interior surface of said depending sidewall at spaced intervals,
   f) said top being similar in shape but larger in size than said base so that said top can fit thereover,
   g) said top being rotatable between two positions relative to said base,
   h) said ribs on said top passing vertically through said grooves on said base, when said top is in a first position, until the upper edge of said sidewall on said base contacts the underside of said upper surface,
   i) while said top telescopes over said base to lower the feed assembly into a position suitable for small to medium sized dogs.

2. An animal feeder assembly as defined in claim 1 wherein said ribs on said top engage the upper edge of said sidewall of said base, when said top is rotated relative to said base to a second position, thereby elevating said top into a position suitable for larger dogs.

3. An animal feeder assembly as defined in claim 2 wherein hand holds are located at opposite ends of the top to facilitate handling the top.

4. An animal feeder assembly as defined in claim 2 wherein notches are formed in the lower edge of each rib, said notches receiving the upper edge of said sidewall of said base in a stable manner.

5. An animal feeder assembly as defined in claim 1 wherein said grooves are arcuate in shape and extend into the interior of said base.

6. An animal feeder assembly as defined in claim 1 wherein said top surface and said depending sidewall of said top open downwardly and said bottom wall and said upstanding side wall of said base open upwardly to define large volume of storage space therebetween.

* * * * *